(12) United States Patent
Rupert et al.

(10) Patent No.: US 8,363,425 B2
(45) Date of Patent: Jan. 29, 2013

(54) TEMPERATURE SENSOR MOUNTING ARRANGEMENT FOR A BATTERY FRAME ASSEMBLY

(75) Inventors: Charles Rupert, Dardenne Prairie, MO (US); John Endres, Kalamzoo, MI (US); Frank Rinderspacher, Schoolcraft, MI (US); Richard Wilson, Portage, MI (US)

(73) Assignee: Mann + Hummel GmbH, Ludwigsburg (DE)

( * ) Notice: Subject to any disclaimer, the term of this patent is extended or adjusted under 35 U.S.C. 154(b) by 284 days.

(21) Appl. No.: 12/907,085

(22) Filed: Oct. 19, 2010

(65) Prior Publication Data
US 2011/0090666 A1 Apr. 21, 2011

Related U.S. Application Data

(60) Provisional application No. 61/253,149, filed on Oct. 20, 2009.

(51) Int. Cl.
*H02B 1/01* (2006.01)
(52) U.S. Cl. .......... 361/829; 429/99; 429/159; 429/407; 429/415; 429/439; 320/109; 320/110; 320/116; 320/124; 180/2.1
(58) Field of Classification Search .................. 361/829; 429/99, 159, 407, 415, 439; 320/109, 110, 320/116, 124; 180/2.1
See application file for complete search history.

(56) References Cited

U.S. PATENT DOCUMENTS
2006/0091891 A1 5/2006 Woo
2010/0136392 A1 6/2010 Pulliam

FOREIGN PATENT DOCUMENTS
JP 2009087583 A 4/2009
WO WO2006067903 A1 6/2006

OTHER PUBLICATIONS

EP Office Action of EP 10188130.8-1227 2315302 Dated Aug. 6, 2012.
EP Search report EP 10 18 8130, (Jun. 8, 2012).

*Primary Examiner* — Xiaoliang Chen
(74) *Attorney, Agent, or Firm* — James Hasselbeck

(57) ABSTRACT

A temperature sensor mounting arrangement for a battery frame assembly in which a plurality of rechargeable battery packs are supported and interconnected. The arrangement includes an elongated support member secured to a battery frame member and extending into an interior region of the frame member. At least one electrical interface connector is secured to a first end of the support member and an electronic temperature sensor is secured to a face of the support member in a target position proximate to a battery pack outer surface. A plurality of electrical conductors interconnects between the electrical connectors and the temperature sensor. The temperature sensor mounting arrangement is modularized and designed to enable high speed assembly during manufacturing and ensure repeatable frame to frame sensor positioning and accuracy of temperature readings.

11 Claims, 3 Drawing Sheets

TEMPERATURE SENSOR MOUNTING ARRANGEMENT FOR A BATTERY FRAME ASSEMBLY

CROSS REFERENCE TO RELATED APPLICATIONS

The present application claims the benefit of U.S. Provisional Patent Application No. 61/253,149, filed Oct. 20, 2009 entitled "TEMPERATURE SENSOR MOUNTING ARRANGEMENT FOR A BATTERY FRAME ASSEMBLY" and which is hereby incorporated by reference in its entirety.

TECHNICAL FIELD

The present invention relates to rechargeable battery frame assemblies for electrically powered vehicles and, more particularly, to a modular temperature sensor mounting arrangement for such battery frame assemblies.

BACKGROUND OF THE INVENTION

Electric and hybrid electric vehicles are seen as offering advantages in the reduced use of petroleum and fossil fuels as well as in reduced emissions of green house gases.

"Plug-in" electric vehicles and more conventional hybrid internal combustion and electrically operated vehicles require substantial numbers of rechargeable storage battery packs for chemically storing and providing the required electrical energy to power the electric drive system of the vehicle. Battery packs are typically arranged into electrically additively connected groups as required to provide increased current handling and increased voltage. It is well known that increased current handling capabilities may be provided by electrically connecting battery packs in parallel while a series connection may be utilized to increase available voltage.

The challenges in packaging, interconnecting, controllably discharging and recharging such battery packs are well known. It is desirable to arrange battery packs into a close fit side by side arrangement to minimize the overall size of the battery frame assemblies, reduce space requirement and increase the stored and available energy density of the battery frame assemblies. When battery packs are closely packed together, heat generated by the charging and discharging of the battery packs can accumulate thereby potentially elevating the battery temperature above a safe temperature threshold suitable for operation.

To provide for safe operations and avoid overheating of such groups of battery packs, it is known to provide a temperature measurement device or devices configured to measure the battery temperature. The temperature measurement devices may communicate with a battery controller device configured to compensate for rising battery temperature by adjusting (for example) the flow of coolant or cooling air flow to the batteries and/or acting to reduce the battery charge or discharge amperage rates, thereby acting to prevent thermal damage to the batteries.

Conventionally, the temperature measurement device may be affixed to or secured within the battery pack to be monitored, or alternately the device may be secured to a portion of the battery frame, for example, by an adhesive. Such solutions are often less than optimal as they may often interfere with replacement of a defective battery pack in a battery frame assembly. It is also possible that the temperature sensor device does not remain optimally and correctly positioned relative to the battery pack during its service life, thereby resulting in inaccurate battery temperature detection and resulting in inaccurate battery temperature control.

There remains a need in the art for a temperature sensor mounting arrangement for battery frames of rechargeable battery packs, a solution that enables high speed assembly during frame manufacturing, ensures correct and frame to frame repeatable positioning of the temperature sensor, provides repeatable and reliable temperature measurements from frame to frame, and remains properly positioned when the battery frame is dismantled and then later reassembled, such as when replacement of one or more battery packs is necessary.

SUMMARY OF THE INVENTION

In various aspects of the invention, a temperature sensor mounting arrangement for a vehicle battery frame assembly is disclosed. The invention is finds advantageous applications in applications where a large number of battery packs are packaged into battery frames, for one example, with hybrid electric or electric vehicle battery frame assemblies. In such assemblies a series of individual repeating battery frames are configured to mount side by side, with each frame configured to mount one or more battery packs into a close pack or side by side relationship. For our discussions herein, the battery frame assemblies may be characterized as a serially positioned set of repeating battery frames that engage side to side and terminate at opposing ends of the battery frames by end frames. As discussed earlier, temperature sensing devices are useful to monitor the operating temperature of the batteries and provide for safe operation.

The disclosed temperature sensor mounting arrangement includes an elongated support member secured onto a frame member, such as a repeating battery frame or an end frame. The support member extends from a peripheral portion of the frame member extending into an interior region of the frame member. The support member is substantially aligned with a major plane of the frame member so as to lie within the width of the frame member. At least one electrical interface connector is secured to a first end of the support member. An electronic temperature sensor device is provided for measuring battery temperature in the frame and is secured to a face of the support member with the support member specifically positioning and supporting the temperature sensor device in a specific location proximate to an outer surface of one of the battery packs. The positioned temperature sensor is responsive to the temperature at the battery outer surface.

A plurality of electrical conductors are secured to and extends parallel to at least one face of the support member along at least a portion of the support member. The electrical conductors electrically connect the electrical interface connectors to the temperature sensor device to enable electrical communication of the measured temperature through the interface connectors to the outside world, for example to a battery control module.

The battery frame assembly is configured to permit disassembly for battery pack replacement, when the need arises. During disassembly and assembly the support member and temperature sensor remains permanently secured to and specifically positioned on the frame member.

In another aspect of the invention, an electrically insulating sheet is provided between the support member and the outer surface of the nearby battery pack. Preferably the insulating sheet is secured to the frame member by the same mounting members used to secure the support member to the frame member, thereby further aiding high speed assembly of the battery frames.

In another aspect of the invention, the insulating sheet includes an opening therethrough positioned in a location between the temperature sensor device and the outer surface of the battery pack. The opening enables improved temperature response (shortened response time) of said temperature sensor without the insulating/dampening effects of the insulator sheet.

In another aspect of the invention, the support member is formed of an electrically insulating material, preferably a flame retardant material. In this aspect of the invention the support member further includes an electrically conductive sheet secured to a face of the support member. Electrical conductors are formed on the support member by etchably or chemically removing portions of the electrically conductive sheet so as to form the conductors. The temperature sensor device and at least one electrical connector are electrically conductively bound to the electrical conductors by soldering.

In another aspect of the invention, the support member is substantially rigid.

In another aspect of the invention, the temperature sensor is configured to provide a correlated change in electrical resistance in relationship to changes in said measured temperature.

In another aspect of the invention, a silicone based potting material is arranged on the elongated support member to encapsulate the temperature sensor, thereby protecting the temperature sensor and providing further electrical insulation. Preferably the potting material is adapted for improved thermal conductivity.

In another aspect of the invention, the support member is fixedly secured to the frame member by at least one thermally activated mounting member, allowing for high speed assembly.

In another aspect of the invention, the at least one thermally activated mounting members are realized as heat stakes.

In another aspect of the invention, the measured battery temperature is communicated through the electrical interface connector(s) to a controller device operable to regulate at least one of the battery charging current and battery coolant flow according to the measured temperature.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
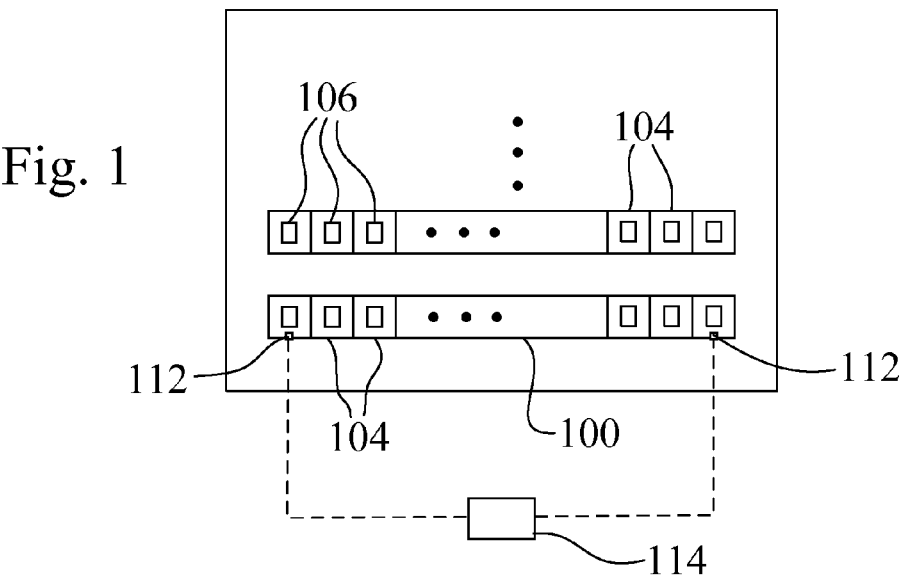
FIG. 1 is a schematic representation of a battery frame assembly packaging a plurality of rechargeable battery packs.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a modular temperature sensor mounting arrangement for a battery frame assembly packaging one or more interconnected battery packs. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 is a schematic representation of a rechargeable battery system, such as may be utilized for an electric or hybrid vehicle (for a particular example). The rechargeable battery system includes one or more battery frame assemblies 100. Each battery frame assembly 100 may include a plurality of serially arranged repeating battery frames 104, with each battery frame supportively retaining and providing for electrical interconnection of one or more battery packs 106 packaged therein.

An end frame 108 may be provided at one or more of the opposing ends of the serially arranged battery frames 104, forming a complete battery frame assembly 100. The end frames 108 may each also include one or more battery packs 106 supportively retained therein. To enhance the structural rigidity of the battery frame assembly 100, the end frames 108 preferably includes structural features to strengthen the rigidity of the end frame, for example an embossed steel end plate (see FIGS. 4 and 5). Compression members (not shown) may extend through the repeating battery frames 104 and into the end plates 110 of the end frames 108. The compression members are configured to compressibly secure the individual frame members of the battery frame assembly 100 together to form a unitary battery frame assembly 100.

The battery packs 106 are electrically interconnected within the battery frame assembly 100 to provide a rechargeable reservoir of stored chemical potential energy that may be controllably returned to electric energy for powering, for example, an electric drive system of a hybrid or electric vehicle.

In the present invention, the battery frame assemblies include one or more temperature sensor devices 112 secured to one or more of the end frames 108 (or provided with and secured to individual repeating battery frames 104) and configured to detect the temperature of battery packs 106. The temperature sensor devices 112 may be realized as electronic devices configured to detect and electrically relay the battery pack temperature to a remote battery system control device 114 which preferably is configured and adapted to operably regulate battery charging/discharge current and battery coolant flow (for example, cooling air or liquid coolant) to maintain battery pack temperature within a desired and safe operating temperature range and prevent damage to the battery packs.

Advantageously, a temperature sensor mounting arrangement is disclosed herein that specifically and repeatably positions and supports the temperature sensor devices in a specified location proximate to an outer surface of at least some of the battery packs 106, as will be discussed in detail below.

Motor vehicles may be configured in different ranges of electrification requiring rechargeable battery systems of differing capacities. The range of lower to higher battery storage capacity may be roughly outlined as: Hybrid electric vehicles, plug-in hybrids, and then fully electric battery powered vehicles. Plug-in hybrid vehicles may require storage battery capacity approximately on the order of 6200 Wh, while fully electric battery vehicles often utilizing larger capacities and hybrid electric vehicles requiring smaller storage capacities.

A variety of battery technologies may be utilized in such systems including lead-acid, nickel metal hydride and lithium ion batteries, with lithium ion the currently preferred technology. The battery system is preferably monitored and controlled by a battery monitoring and control system 114 to maintain battery condition and safety during vehicle operation. Measured parameters may include battery charging/discharge current, battery temperature and battery voltage, among others.

When a temperature sensor device is secured directly to a battery pack such as used in a hybrid vehicle or the like, battery replacement is made more difficult. In some cases the battery temperature sensing device may be extended from lead wires and be manually affixed to or positioned near to the battery pack, perhaps adhesively secured onto the battery frame. In these commonly practiced variations, it may be difficult to provide an accurate and repeatable positioning of the temperature sensor, resulting in an inaccurate battery temperature reading. Additionally, improper and variable positioning may be expected to affect the accuracy of the battery temperature measurement as the temperature sensing device may be easily affected (for example) factors such as battery cooling air or other coolant means provided to remove heat from the battery packs.

Additionally, when the temperature sensing device is wired using a harness or cable that then must be routed between components and around ribs and interferences (such as battery frames and end plates), this routed cabling may hinder the accessibility and replaceability of the battery packs.

Therefore, an objective of the present inventive disclosure is to provide a temperature sensor mounting arrangement for a battery frame assembly that provides specific positioning and support for the temperature sensing devices in the targeted location at the sidewall of the battery pack and avoids the cabling, manual positioning, inaccurate positioning and resulting inaccurate temperature sensing of the prior art.

Another object of the invention is to provide a temperature sensor mounting arrangement that is a modular component and particularly suitable for high speed manufacturing and which assures proper temperature sensor positioning and temperature measurement repeatability frame to frame.

Figure 2:
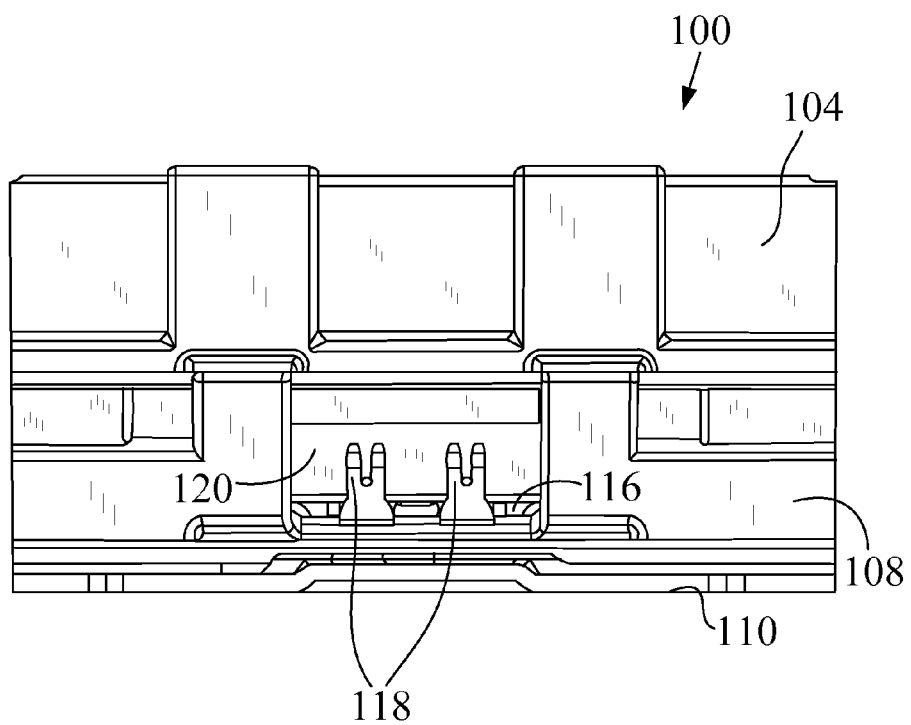
FIG. 2 depicts a top view of a portion of a battery frame assembly including a temperature sensor mounting arrangement, consistent with the present invention.

FIG. 2 depicts a top view of a portion (illustrating an end frame 108 and one battery frame 104 of a repeating set of battery frames) of a battery frame assembly 100 including a modular temperature sensor mounting arrangement. A top portion of an elongated support member 116 includes two spaced electrically conductive interface connectors 118 secured thereto with the electrical interface connectors 118 extending outwards above the end frame 108. The extending electrical interface connectors 118 are configured to press against and electrically communicate with mating electrical contacts (not shown) for communicating the measured battery temperature to the battery system control device 114. An edge portion of a steel end plate 110 of the end frame 108 is visible. A folded over portion of an insulator sheet 120 is visible under the electrical interface connectors 118. The folded over portion of the insulator sheet provides additional electrical insulation between the battery pack and the electrical interface connectors 118. The insulator sheet 120 continues in the end frame 108 by extending downwards into the end frame 108 between the elongated support member 116 and the battery pack 106.

Figure 3:
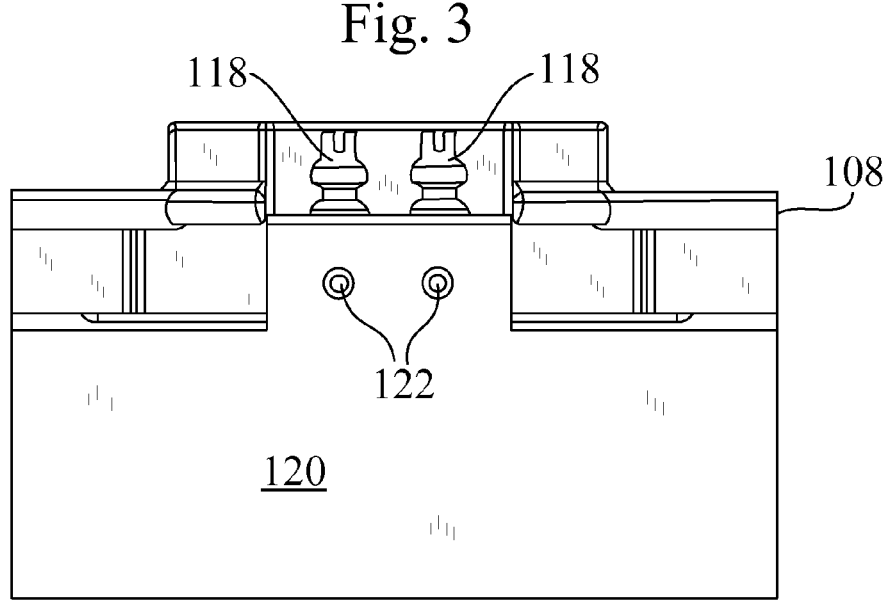
FIG. 3 depicts a partial side view of a portion of an end frame equipped with a temperature sensor mounting arrangement, consistent with the present invention.

FIG. 3 depicts a partial side view of a portion of an end frame of FIG. 2 equipped with the modular temperature sensor mounting arrangement of the present invention. The insulator sheet 120 is again clearly visible. In FIG. 3 the visible side of the insulator sheet 120 would face the outside surface of a battery pack 106 (not shown) when assembled into the unitary battery frame assembly 100. The insulator sheet 120 is heat staked (heat stakes 122) onto the elongated support member 116 positioned directly behind the insulator sheet 120. The heat staking of the insulator sheet 120 to the elongated support member 116 is particularly advantageous for high speed assembly as heat stakes are readily and quickly thermally activated (thermally softened/deformed) onto the insulating sheet 120. The insulating sheet 120 serves to electrically isolate the battery pack 106 from the steel end plate 110 of the end frame 108, as well as to electrically isolate the battery pack 106 from temperature sensor device 112 and its electrical connections.

Figure 4:
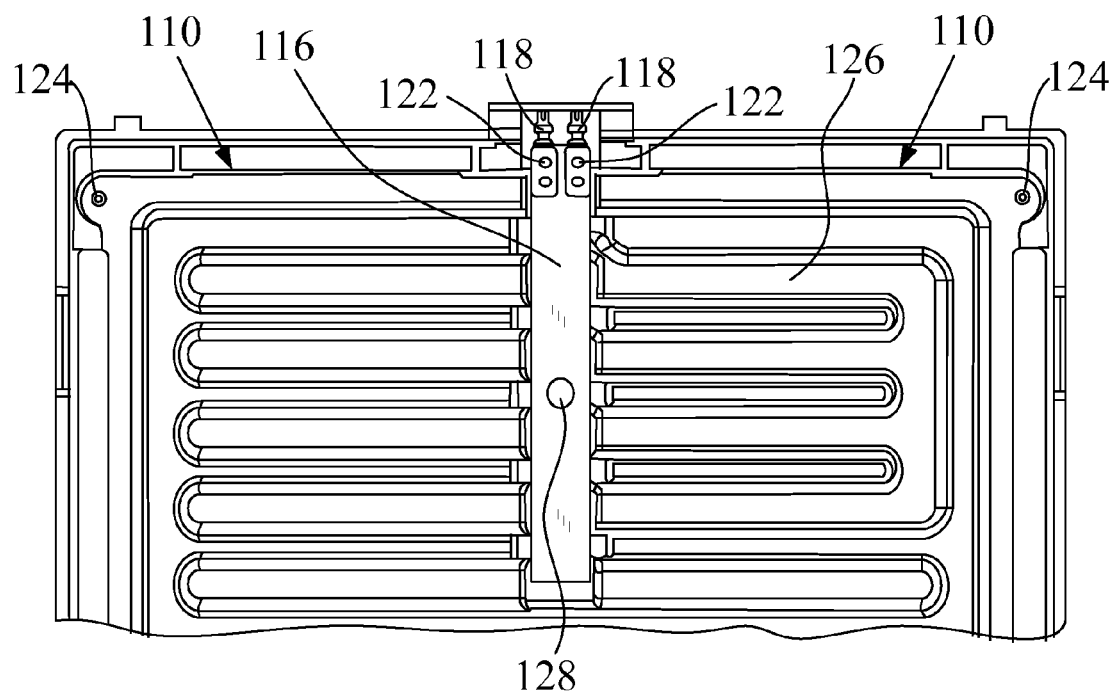
FIG. 4 depicts a partial side view of the end frame of FIG. 3 in which the insulating sheet has been removed to better illustrate features of the present invention.

FIG. 4 depicts a partial side view of the end frame 108 of FIG. 3 in which the insulating sheet 120 is now removed so as to better illustrate features of the present invention. The end plate 110 is shown secured to the end frame 108 by heat stakes 124. As can be appreciated in FIG. 4, steel end plate 110 has a plurality of stamped grooves or ridges 126 formed into the plate and configured to stiffen the end plate 100 against bending forces, such as those that may result from the compression members securing the battery frames 104 and end frames 108 into a unitary battery frame assembly 100. The stamped (or otherwise formed) grooves or ridges in the end plate 110 are partially collapsed in a vertical region sized to accommodate the elongated support member 116. The elongated support member 116 is thereby accommodated within the height of the grooves or ridges 126 thereby permitting a tight fitting assembly against the battery pack sidewall without wasting additional valuable space for the elongated support member 116 and the temperature sensing device 112 of the modular temperature sensor mounting arrangement.

Heat stakes 122 (also shown in FIG. 3) secure the elongated support member 116 to the end frame 108 as well as act to secure the insulating sheet 120 to the end frame 108. This shared mounting arrangement further enables high speed assembly by reducing the number of assembly steps during fabrication. The shared heat stakes 122 also assure proper alignment between the insulating sheet 120, support member 116 and the end frame 108.

The temperature sensor device 114, at least in the preferred variation illustrated, is encapsulated or covered by a silicone based encapsulation 128 arranged on the elongated support member 116 (see FIG. 4). Temperature sensor device 114 (not shown in FIG. 4) is positioned under the encapsulation 128 and solderably and/or adhesively mounted on the elongated support member 116. Preferably the elongated support member 116 comprises a structurally rigid electrically non-conductive material. More preferably, the elongated support member is realized from a FR4 flame retardant material and has a thickened, stiff sheet-like form similar to an electronics circuit board. The use of structurally rigid material as opposed to a flexible material is preferred as the elongated support member is better configured to provide repeatable positioning of the temperature sensor device 112 in a specific intended position within the end frame 108 and positioned against the battery pack 106 sidewall, thereby providing repeatable positioning and reliable repeating temperature sensing from frame to frame.

Figure 5:
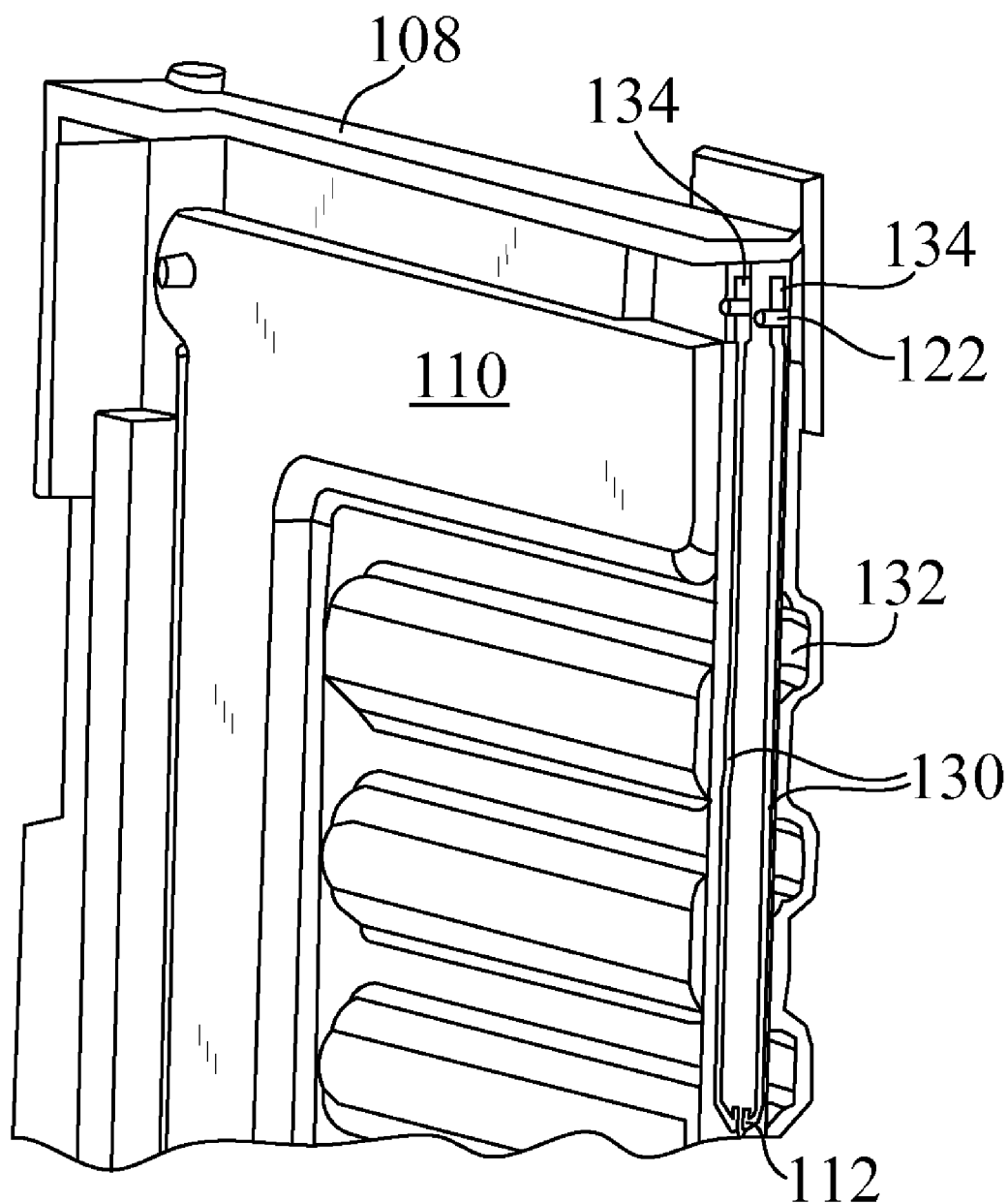
FIG. 5 depicts one particular advantageous embodiment of the invention.

In some preferred embodiments, the elongated support member comprises a FR4 flame retardant material discussed above with an electrically conductive metallic sheet or plating secured to one face of the support member 116. The conductive metallic sheet may then be etched using techniques known to those skilled in the electronics field to etchably realize electrical conductors extending between the electrical interface connectors 118 and the temperature sensor device 112. One possible routing and embodiment of these etched conductors is shown in FIG. 5. In FIG. 5 the elongated support member 116 has two spaced apart electrical conductors 130 secured to a face of the elongated support member and electrically connecting the temperature sensor device 112 to the electrical interface connectors 118. For high speed assembly of the temperature sensor device on the elongated support member it is particularly desirable to utilize surface mount soldering techniques. These techniques may be used to solderably secure the temperature sensor device 112 to the etched conductors 130 and additionally to solderably secure the electrical interface connectors 118 to the elongated support member 116 by way of solder pads 134 formed on the top portion of the etched conductors 130. Electrical interface connectors 118 are omitted in FIG. 5 to permit depiction of the solder pads 134.

FIG. 5 also particularly illustrates the partially collapsed grooves or ridges 126 in a region around the elongated support member 116, providing space to receive the elongated support member 116 within the space otherwise occupied by the steel end plate 110. As can be seen in FIG. 5, a grooves or ridges 126 are not fully collapsed (see area 132), the uncollapsed portions of the grooves or ridges 126 operable to continue to provide structural support to the end plate 110 around and under the elongated support member 116.

In preferred embodiments, the temperature sensor device 112 is a suitable variety of thermistor. A thermistor is essentially a type of resistor whose electrical resistance varies predictably and accurately with changes in temperature. With such devices, the temperature sensed by the thermistor may be determined by measuring the resistance of the thermistor. By intelligent selection of thermistor resistance to have a operating resistance much, much greater than the resistance of the electrical conductors, then the measured resistance at a remote point (for example at the battery system control device 114) may be considered to completely result from the thermistor and may be used to calculate battery temperature without introducing meaningful errors into the battery temperature measurement.

Advantageously, the temperature sensor mounting arrangement described and illustrated above permits high speed assembly of battery temperature sensors into battery frame assemblies accommodating replaceable battery packs, and ensures specific and proper positioning of the temperature sensors relative to the proximate battery pack, with repeatable temperature measurement results from frame to frame.

For simplicity and brevity the discussion above was directed to integration of a temperature sensor mounting arrangement into end frames of battery frame assembly. It should be readily apparent that apparatus of the present disclosure and assembly techniques can be advantageously applied to utilizing the temperature sensor mounting arrangement with repeating battery frames 104 as well as with the end frames 108 discussed above.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims The invention is defined solely by the appended claims including any amendments made during the pendency of this application and all equivalents of those claims as issued.

The invention claimed is:

1. A temperature sensor mounting arrangement in a battery frame assembly comprising:
    a plurality of serially arranged battery frames arranged in a side by side configuration;
    end frames arranged at opposing ends of said battery frame assembly;
    a plurality of rechargeable battery packs supportively retained and electrically interconnected within said battery frame assembly therein;
    said temperature sensor mounting arrangement comprising:
        an elongated support member secured to a frame member, said frame member consisting of one of said battery frames or end frames,
        wherein said support member extends from a peripheral portion of said frame member into an interior region of said frame member;
        at least one electrical interface connector secured to a first end of said support member;
        an electronic temperature sensor device positioned and secured at a face of said support member, wherein said support member specifically positions and supports said temperature sensor device proximate to an outer surface of one of said battery packs, said specific positioned temperature sensor responsive to temperature at said battery outer surface;

a plurality of electrical conductors arranged on at least one face of said support member electrically connecting said at least one interface connector to said temperature sensor device electrically communicating said measured temperature as an electrical signal to said interface connector;

wherein said temperature sensor mounting arrangement maintains said temperature sensor specifically positioned relative to said battery pack outer surface, providing repeatable temperature measurements between said sensors frame to frame; and wherein said elongated support member with said temperature sensor and electrical connectors are a one-piece modular unit subassembly configured for high speed mounting to said frame member.

2. The temperature sensor mounting arrangement of claim 1, wherein said end frame further comprises:

a rigid end plate having a plurality of grooves or ridges formed therein, said grooves or ridges configured to add rigidity to said end plate;

wherein said elongated support member extends proximate parallel to a portion of said end plate; and wherein portions of said grooves and ridges are partially collapsed in a region over which said support member extends, wherein said partially collapsed region receives said elongated support member within a thickness of said end plate enabling a tight fitting space saving assembly between said end plate and a neighboring one of said battery packs.

3. The temperature sensor mounting arrangement of claim 1, wherein an electrically insulating sheet is arranged between said support member and said proximate outer surface of said battery pack; and wherein said insulating sheet is secured to said frame member in unison with said support member.

4. The temperature sensor mounting arrangement of claim 3, wherein said insulating sheet includes an opening therethrough provided in a location proximate to said temperature sensor device and between said temperature sensor device and said proximate outer surface of said battery pack, said opening configured to reduce response time of said temperature sensor.

5. The temperature sensor mounting arrangement of claim 1, wherein said support member is formed of an electrically insulating material;

wherein said support member includes an electrically conductive metallic sheet secured to a face of said support member;

wherein said electrical conductors are formed by etchably or chemically removing portions of said electrically conductive sheet; and wherein said temperature sensor device and at least one electrical connector are electrically conductively bound to said electrical conductors by soldering.

6. The temperature sensor mounting arrangement of claim 1, wherein said support member is substantially rigid.

7. The temperature sensor mounting arrangement of claim 1, wherein said temperature sensor is configured to provide a correlated change in electrical resistance in relationship to changes in said measured temperature.

8. The temperature sensor mounting arrangement of claim 1, further comprising a silicone based potting material encapsulating and protecting said temperature sensor on said support member.

9. The temperature sensor mounting arrangement of claim 1, wherein said support member is secured to said frame member by at least one thermally activated mounting member adapted for high speed assembly.

10. The temperature sensor mounting arrangement of claim 9, wherein said at least one thermally activated mounting member comprises heat stakes.

11. The temperature sensor mounting arrangement of claim 1, wherein said measured temperature is communicated through said at least one electrical interface connector to a controller device operable to regulate at least one of battery charging current and battery coolant flow according to said measured temperature.

* * * * *